2,925,314

PROCESS OF DYEING AND PRINTING CELLULOSE DERIVATIVES

Julius Eisele, Ludwigshafen (Rhine), Wilhelm Federkiel, Frankenthal (Pfalz), and Curt Schuster and Karl Maier, Ludwigshafen (Rhine), Germany, assignors to Badische Anilin- & Soda-Fabrik Aktiengesellschaft, Ludwigshafen (Rhine), Germany No Drawing. Application September 16, 1955
Serial No. 534,866

Claims priority, application Germany September 17, 1954

15 Claims. (Cl. 8—85)

This invention relates to improving the ability for being dyed and printed of articles and textiles of organic cellulose derivatives, in particular esters and ethers, as for example cellulose acetate, cellulose triacetate and ethyl cellulose.

We have found that very fast dyeings and prints are obtained on textile material consisting of or containing organic derivatives of cellulose by treating the textile material before the dyeing or during the dyeing with an ester of a carbamic acid and a saturated alcohol containing an amino group. The dyestuffs used for the dyeing process may contain sulfonic acid groups or sulfonic acid amide groups or both sulfonic acid and sulfonic acid amide groups. The dyestuffs may also contain complex combined metal or metallizable groups.

Amino alcohols, the carbamid acid esters of which are suitable for the present invention are meant to include those having the amino group or groups in tertiary position, for example, alpha.omega-alkylolamines which are substituted on the nitrogen by aliphatic, cycloaliphatic or araliphatic radicals. The radicals can be identical or different. They may in turn contain hydroxyl groups and they may also with the nitrogen atom be members of a hetero ring which may contain yet further hetero atoms. Amino alcohols of the said kind are, for example, N-dimethyl-, N-diethyl- and N-dipropyl-ethanolamine, N-dimethylpropanolamine-(1.3), N-dimethylisopropanolamine, N-methyl-, N-ethyl-, N-propyl-, N-butyl-, N-cyclohexyl- and N-benzyl-dialkylolamines, trialkylolamines, N-(beta-hydroxyethyl)-pyrrolidine, -piperidine, -hexamethylene-imine and -morpholine, and N-(beta-hydroxyethyl)-imidazole.

The structure of the amino-alcohols is expressed by the following general formula:

(I)   

in which R may be a straight-chain or branched alkyl radical, R' may be an alkyl radical, a cycloalkyl radical or an arylalkyl radical and R" may be an alkyl radical, a cycloalkyl radical or an arylalkyl radical. The radicals R' and R" may contain hydroxyl groups. In

R' and R" may in turn be linked with each other and may thus form parts of a heterocyclic compound.

then stands for the radical of, for example, pyrrolidine, piperidine, hexamethylene-imine, morpholine or imidazole.

Alkylene diamines or polyalkylene polyamines which contain in the molecule at least one hydroxyl group which is connected with any of the amino groups by way of an alkylene radical may also be used as initial materials for the production of the carbamid acid esters to be used. The hydroxyl groups may thus be situated on an alkyl substituent of an amino group or on an alkylene chain between two amino groups. For the rest the same rules apply as for the substituents of the above-mentioned alpha-omega-alkylolamines. Thus for example all substituents may contain hydroxyl groups, such as is the case with the reaction products of di-(aminoalkyl)-amines with 1 molecule of ethylene oxide for each of the hydrogen atoms attached to a nitrogen atom. Amino alcohols of this kind are, for example, 1.3-bis-dimethylamino- or 1.3-bis-diethylamino-isopropanol, the reaction products of 1 mol of alkylene diamine with 4 mols of alkylene oxide or of 1 mol of di-(aminopropyl)-amine, of the formula, for example $HN-(CH_2CH_2CH_2NH_2)_2$ or $$HN-(-CH_2-CHNH_2-CH_3)_2$$

with 5 mols of ethylene oxide. The two amino groups may also be members of a common hetero ring, as for example in N.N'-di-(hydroxyethyl)-piperazine.

The structure of these alcohols is expressed by the following general formula:

(II)  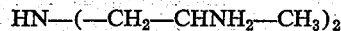

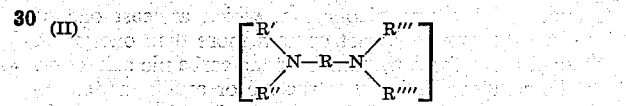

in which R may be a straight-chain or branched alkyl radical which may also be interrupted by hetero atoms, as for example nitrogen or other structure as hereinafter described; R', R", R'" and R"" may be identical or different alkyl radicals, cycloalkyl radicals and/or arylalkyl radicals, and X is 1 or more than 1. The maximum of OH groups in the amino alcohols generally is determined by the number of substituents of the amino group or groups, but it does by no means interfere with the object of our invention if all OH groups will not enter into the formulation of the carbamic acid ester. It is immaterial on which of the radicals R to R"" a hydroxyl group is situated.

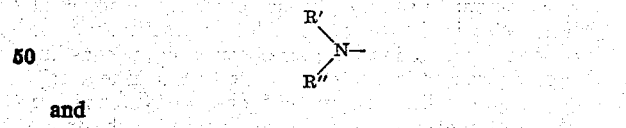

and may also be radicals of heterocycles in the manner described under Formula I.

In Formula II, R may also be the radical of a cycloaliphatic or aromatic ring or a hetero ring. R may also embody a plurality of these systems. For example R may be

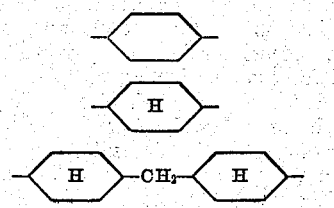

Alcohols containing amino groups, with which the carbamic acid is esterified, may also be systems such as (III) 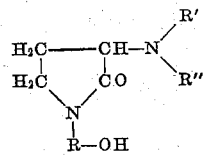

in which R, R' and R" have the significance given under Formula I.

As carbamic acids, the esters of which with the amino alcohols are used in accordance with the present invention, the carbamic acids with aromatic, aliphatic, araliphatic or cycloaliphatic substituents on the amide nitrogen are especially suitable, typified for example by the formula (IV)     RHN—COOH wherein R is an alkyl, aryl, cycloalkyl or arylalkyl radical.

The preparation of the monomeric carbamic acid esters is preferably effected by reaction of the hydroxyalkylamines with organic isocyanates. Suitable isocyanates are, for example, phenyl isocyanate, hexamethylene di-isocyanate and toluylene di-isocyanate. Carbamic acid esters which have been obtained by reaction of monoisocyanates with amino alcohols containing one or more hydroxyl groups or of amino alcohols containing one hydroxyl group with mono- or poly-isocyanates are quite generally suitable. Monomeric carbamic acid esters as used in the practice of our invention are thus meant to include compounds formed by the interaction of such isocyanates and amino alcohols of which at least one of the two reactants does not contain more than one group that goes into the formulation of the carbamic acid ester.

The cellulose derivative structure or article, as for example threads, fibres, foils, spun good, ribbons and fabrics, which may also be mixed with other fibrous material, may be treated with the carbamic acid esters before the dyeing or at the same time as the dyeing. The treatment with the carbamic acid esters may be carried out in a bath to which the dyestuff is subsequently added. Cellulose material which has been pretreated with the carbamic acid esters may also be dyed in a fresh bath. Finally the dyebath itself may contain the carbamic acid ester. In this case it is preferable to add the organic or inorganic acids necessary for the application of the dyestuff to the dyebath not all at once, but in portions during the dyeing. Instead of the free acids there may also be used substances which split off acid during the dyeing process, as for example ammonium sulfate. In each case may be dissolved or suspended in the treatment bath. In practical use the form of the carbamic acid ester depends on the constitution of the carbamic acid ester. The treatment temperature preferably lies between 60° and 90° C., and the duration of the treatment depends in turn on the treatment temperature. In general a quarter to half an hour is sufficient.

Another method of introducing the carbamic acid ester into the fibrous material consists in mixing the carbamic acid ester with the cellulose derivative before the primary spinning and then spinning into fibres in the usual way. However, fibres spun without the addition of carbamic acid esters may also be led immediately after spinning through a bath which contains the carbamic acid ester dissolved or suspended therein. The carbamic acid esters to be used according to the present invention may be used alone or in admixture with each other or in admixture with other agents for improving dyeability such as are described for example in the copending U.S. Patent application Serial No. 371,406, filed on July 30, 1953, by Gustav Schwen, Julius Eisele and Wilhelm Federkiel.

The amount of carbamic acid ester which is used according to the present invention may vary within wide limits. In general 0.1% to 3% by weight of carbamic acid ester with reference to the cellulose derivative is sufficient. In many cases it may be preferable to use large amounts, especially when dyeings or prints with deep shades are to be prepared.

Dyestuffs with which cellulose derivatives can be dyed by the process according to this invention are of the water-soluble type. They include, for example, dyestuffs which are derived from aminoanthraquinone and which contain sulfonic acid or sulfonic acid amide groups.

Examples of such dyestuffs are 1,4-diamino-anthraquinone-2-sulfonic acid,
1-amino-4-phenylaminoanthraquinone-2-sulfonic acid,
1-amino-4-(meta - cyanophenylamino) - anthraquinone-2-sulfonic acid,
1,4-diamino-2-phenoxyanthraquinone-3-sulfonic acid,
1,5-dihydroxy - 4,8 - di - (monomethylamino) - anthraquinone-2-sulfonic acid,
1-cyclohexylamino-4 - (para-acetylamino) - phenylamino-anthraquinone-6-sulfonic acid,
1-hydroxy-4-diphenylamino-anthraquinone - sulfonic acid or
1-amino-4-meta-(N.N-dihydroxy - ethylsulfamide) - phenylamino-anthraquinone-2-sulfonic acid.

We may also use azo dyestuffs, such as the azo dyestuff prepared from diazotized 1-amino-4-methyl-benzene-3-sulfonic acid anilide and 1-hydroxynaphthalene-4-sulfonic acid or from diazotized aniline and 1-para-sulfophenyl-3-methyl-5-pyrazolone or from diazotized 1-amino-2.5-dichlorbenzene-4-sulfonic acid and N-ethyl-N-benzyl-aniline or from diazotized aniline and 2-chloroacetylamino-5-hydroxynaphthalene-7-sulfonic acid or from diazotized aminobenzene-4-sulfonic acid and 2-hydroxynaphthalene or from diazotized 2-amino-5-N-ethyl-N-benzoylamino-toluylene and 1-hydroxynaphthalene-4-sulfonic acid or from diazotized 1-amino-2-methoxy-5-nitrobenzene and 2-phenylamino-5-hydroxynaphthalene-7-sulfonic acid or from diazotized 1-amino-2-N-ethyl-N-phenyl-sulfoamido-4-nitrobenzene and 2 - amino-5-hydroxynaphthalene-7-sulfonic acid in which the nitro group had been reduced to the amino group.

The complex heavy metal compounds of azo dyestuffs may also be used, for example, the complex copper compound of the azo dyestuff prepared from diazotized 2-amino-1-hydroxy-benzene-4-sulfonic acid and 2-hydroxy-naphthalene, the complex cobalt compound of the azo dyestuff prepared from diazotized 2-amino-1-hydroxybenzene-4-sulfonamide and 2-hydroxy-naphthalene, or the complex chromium compound of the azo dyestuff prepared from diazotized 4-chlor-2-amino-1-hydrobenzene and 2-hydroxynaphthalene-6-sulfonic acid.

A further group of suitable dyestuffs are the condensation products of 4-amino-3-sulfonaphthalene-1,8-dicarboxylic acid anhydride and aromatic amines such as aminobenzene, 1-amino-4-methyl-benzene or 1-amino-4-chlorbenzene.

Moreover there may also be used for the process, dyestuffs which, besides sulfonic acid or sulfonamide groups, also contain metallizable groups. The dyeings prepared therewith can be still further improved in their fastness properties by treatment with metal salt solutions.

This effect is especially surprising because the materials to be dyed according to this invention are structures of cellulose derivatives, and because, as the metal salt solutions, there may be used for example those of hexavalent chromium; and in fact without the addition of reducing agents.

The treatment with metal salts can be effected during the dyeing process or following the same. A treatment with solutions of hexavalent chromium salts is especially favorable. Thus, for example, sodium or potassium bichromate may be advantageously used in the aftertreatment, without the addition of reducing agents. As is known from wool dyeing, the shade of the dyeings is altered by treatment with metal salts. The fastness properties are thereby still further improved.

Suitable dyestuffs with metallizable groups for the processes are, for example, ortho-dihydroxyazo and -azomethine dyestuffs, ortho-hydroxy-ortho-aminoazo and -azo-methine dyestuffs, dyestuffs with two adjacent hydroxyl groups or adjacent hydroxyl and carboxylic groups.

The dyestuffs mentioned are only a few examples from the various dyestuff classes which are suitable for the present invention. It is, however, understood that the invention is not restricted to the use of these dyestuffs, since their selection required only ordinary skill.

The dyeing and printing of the organic derivatives of cellulose having incorporated therein the organic nitrogen bases is carried out according to the conventional methods as used for dyeing and printing textile material with acid dyestuffs.

The dyeings and printings thus obtained have excellent fastness properties, in particular they are very fast to rubbing and wet treatments.

The following examples will further illustrate this invention but the invention is not restricted to these examples. The parts are parts by weight, unless otherwise stated.

*Example 1*

100 parts of an acetate rayon fabric are treated for half an hour at 75° to 80° C. in 3000 parts of water containing 2 parts of the carbamic acid ester from 1 mol of phenyl isocyanate and 1 mol of 1,3-bis-diethylamino-isopropanol in finely divided form. The fabric is then rinsed and dyed for half an hour at 80° C. in a fresh bath containing 2 parts of the dyestuff 1-amino-4-(meta-cyanophenyl)-aminoanthraquinone-2-sulfonic acid and 2 parts of 96 percent sulfuric acid in 3000 parts of water. The dyed fabric is finished off in the usual way.

Deep blue dyeings are obtained which have very good fastness to light and good to very good wet fastness properties.

*Example 2*

14 parts of the carbamic acid ester from 1 mole of toluylene di-isocyanate and 2 mols of N-hydroxyethyl-pyrrolidine, dissolved in acetone, are added to a spinning solution containing 1000 parts of acetyl cellulose in acetone, and it is spun into threads in the usual way.

100 parts of these acetate rayon threads are introduced into 2000 parts of water containing 1 part of the azo dyestuff from diazotized 3-methyl-6-aminobenzene-1-sulfonic acid anilide and 1-hydroxynaphthalene-4-sulfonic acid and also 2 parts of 96 percent sulfuric acid and treated for 45 minutes at 80° C.

Brilliant red dyeings with good fastness properties are obtained.

*Example 3*

100 parts of an acetate rayon skein are treated for 20 minutes at 75° to 80° C. in 2000 parts of water containing 2 parts of the carbamic acid ester from 2 mols of phenyl isocyanate and 1 mol of N-butyl diethanolamine, in finely divided form, and 2 parts of the dyestuff 1,4-diaminoanthraquinone-2-sulfonic acid. Then 2 parts of 96 percent sulfuric acid are added to the dyebath in four portions at intervals of about 5 minutes each. The dyeing is continued until the dyestuff has been absorbed.

Violet dyeings with good fastness properties are obtained.

*Example 4*

100 parts of acetate rayon fabric are treated for half an hour at 85° C. in 2000 parts of water containing in finely divided form 2 parts of the carbamic acid ester from 1 mol of hexamethylene di-isocyanate and 2 mols of N-dimethyl-isopropanolamine. The fabric is then rinsed and dyed for 30 minutes at 80° C. in a fresh bath consisting of 2000 parts of water, 2 parts of the condensation product of 2,4-dinitrochlorbenzene and para-aminodiphenylamine-ortho'-sulfonic acid and 3 parts of 85 percent formic acid.

Yellow dyeings with good fastness properties are obtained.

*Example 5*

100 parts of acetate rayon fabric are treated for 30 minutes at 80° C. in 2000 parts of water containing 2 parts of the carbamic acid ester from 1 mol of phenyl isocyanate and 1 mol of N-hydroxyethyl-pyrrolidine in finely divided form. The fabric is then rinsed and dyed for half an hour at 85° C. in a fresh bath containing 2 parts of the azo dyestuff from diazotized 2-hydroxy-3-amino-5-nitrobenzene-1-sulfonic acid and 1-hydroxy-4-methylbenzene and also 2 parts of 96% sulfuric acid in 2000 parts of water. After adding 2 parts of potassium bichromate, the whole is heated for 30 minutes at 80° to 85° C.

Deep brown dyeings with very good fastness properties are obtained.

*Example 6*

10 parts of the carbamic acid ester from 2 mols of phenyl isocyanate and 1 mol of N-methyl-diethanolamine, dissolved in acetone, are incorporated in a spinning solution consisting of 1000 parts of acetyl cellulose in acetone, and the mixture is spun in the usual way into threads.

100 parts of these acetate rayon threads are dyed for 40 minutes at 80° C. in 2000 parts of water containing 1 part of the azo dyestuff from diazotized 3-amino-4-hydroxy-5-nitrobenzene-1-sulfonic acid and 2-aminonaphthalene, and also 2 parts of 96% sulfuric acid. The whole is kept for 30 minutes at 80° C. after the addition of 2 parts of potassium bichromate.

Brilliant green dyeings of good fastness to light and good fastness to moisture are obtained.

*Example 7*

100 grams of an acetate rayon skein are treated at 80° for 30 minutes in 2 litres of water which contains 3 grams of the carbamic acid ester from 2 mols of phenylisocyanate and 1 mol of N-ethyldiethanolamine in fine dispersion and 2 grams of the dyestuff 1.4-diaminoanthraquinone-2-sulfonic acid. Then 2 grams of sulfuric acid of 96% strength are added in four portions at intervals of 5 minutes and dyeing is continued until the dyestuff has been absorbed.

The violet dyeings obtained have good fastness properties.

*Example 8*

100 grams of an acetate fabric are treated in 4 litres of water which contains 4 grams of the carbamic acid ester from 2 mols of cyclohexylisocyanate and 1 mol of N-propyldiethanolamine in fine dispersion, at 85° C. for 30 minutes. The fabric is rinsed and dyed in a fresh bath of 4 litres of water which contains 3 grams of the dyestuff 1-amino-4-(m-cyanophenyl) - aminoanthraquinone-2-sulfonic acid and 6 grams of formic acid (85% strength) at 80° C. for 30 minutes, a deep-blue dyeing of good fastness properties being obtained.

*Example 9*

A solution of 1000 kilograms of acetyl cellulose in acetone is combined with a solution of 20 kilograms of the carbamic acid ester from 2 mols of benzyl isocyanate and 1 mol of N-propyldiethanolamine in acetone and the mixture is spun into threads in conventional manner.

100 grams of the acetate rayon threads so obtained are dyed in a bath consisting of 2 litres of water which contains 2 grams of the azo dyestuff obtained by coupling diazotized 2-hydroxy-3-amino-5-nitrobenzene sulfonic acid-(1) with 1-hydroxy-4-methylbenzene, and 2 grams of sulfuric acid of 96% strength at 85° C. for 3 minutes. After adding 2 grams of potassium chromate threads are treated at 85° C. for another 30 minutes, brown dyeings of good fastness properties being obtained.

Example 10

100 grams of an acetate rayon fabric are treated in 3 litres of water which contains 2 grams of the carbamic acid ester from 2 mols of phenylisocyanate and 1 mol of propyldiethanolamine in fine dispersion, at 85° C. for 30 minutes. The fabric is rinsed and then dyed in another bath made up of 3 litres of water, 2 grams of the dyestuff 1.4 - diamino-2-hydroxyphenylanthraquinone-3-sulfonic acid and 2 grams of sulfuric acid of 96% strength at 85° for 30 minutes, violet dyeings of good fastness properties being obtained.

Example 11

Proceeding in the same way as in Example 10 but using 3 grams of the carbamic acid ester from 4 mols of phenylisocyanate and 1 mol of tetrahydroxyethyl ethylene diamine instead of 2 grams of the carbamic acid ester from 2 mols of phenylisocyanate and 1 mol of N-propyldiethanol amine, effects similar to those obtained in Example 10 are obtained.

Example 12

100 grams of an acetate rayon fabric are treated in 4 litres of water which contains 4 grams of the carbamic acid ester from 3 mols of phenylisocyanate and 1 mol of trihydroxyethylamine in fine dispersion, at between 80° and 85° C. for 20 minutes. After rinsing, the fabric is dyed in another bath consisting of 4 litres of water, 1 gram of dyestuff obtained by coupling diazotized aniline with 1-(2'-chlor-6'-methyl-4'-sulfonic acid)-phenyl-3-methylpyrazolone-(5) and 2 grams of sulfuric acid of 96% strength at between 80° and 85° C. for 30 minutes, yellow dyeings of good fastness properties being obtained.

It will be observed that the improvement in the organic cellulose derivatives aforesaid, whereby the receptivity thereof for the dyes is increased, arises from the embodiment of the described carbamic acid esters in those cellulose derivatives either during or prior to the dyeing in any of the various manners above described.

Accordingly, the term "organic cellulose derivatives embodying carbamic acid esters" means the organic cellulose derivatives, as above described and defined, when combined with the above described carbamic acid esters either during the dyeing or prior to the dyeing, in the various manners described.

It will also be understood that the term "dyeing" as used above, includes printing.

Other isocyanates, such as low molecular weight mono- and diisocyanates can be used, for instance aliphatic mono- or diisocyanates containing from two to seven carbon atoms, such as propyl, butyl-, hexylisocyanate, cycloaliphatic mono- and diisocyanates, for instance cyclopentyl-, cycloheptyl-, mono- or di-alkyl-cyclohexyl-isocyanates, for example methyl- and ethylcyclohexylisocyanates, and aromatic or araliphatic mono- and diisocyanates, such as halogen phenylisocyanates, for example chlorphenyl-, methoxyphenyl- or ethoxyphenyl-, naphthyl-, toluyl-, xylyl-, isopropylphenyl- and alkylbenzylisocyanates. The hydrogen atom attached to the nitrogen atom in the carbamic acid ester group may be replaced by an alkoxy group. Therefore, for example N,N-dibutyl carbamic acid ester can also be employed in the practice of our invention.

What we claim is:

1. The method of dyeing articles of cellulose derivatives, said derivatives being esters and ethers of cellulose which comprises incorporating a carbamic acid ester of an aminoalcohol, the amino group of which is a tertiary amino group, in an article of organic cellulose derivatives and dyeing said article with a watersoluble dyestuff containing at least one hydrophilic group selected from the class consisting of a sulfonic acid and a sulfonic acid amide group.

2. The method of dyeing articles of cellulose derivatives as claimed in claim 1 wherein the dyestuff molecule also contains a metallizable group.

3. The method of dyeing articles of cellulose derivatives as claimed in claim 1 wherein said ester of an amino alcohol and a carbamic acid is mixed with the cellulose derivative, said mixture is spun into a fiber and then dyed with said dyestuff.

4. The method of dyeing articles of cellulose derivatives as claimed in claim 1 wherein the ester used is made from an isocyanate and an amino alcohol.

5. The method of dyeing articles of cellulose derivatives as claimed in claim 1 wherein the ester used is made from an aliphatic isocyanate and an amino alcohol.

6. The method as claimed in claim 1 wherein the amino alcohol used contains more than one tertiary amino group.

7. The method of dyeing articles of cellulose derivatives as claimed in claim 1 wherein the tertiary amino group in the amino alcohol is a member of a hetero ring.

8. The method of dyeing articles of cellulose derivatives as claimed in claim 1 wherein a bisdialkylamino-hydroxyalkyl compound is used as an amino alcohol.

9. The method of dyeing articles of cellulose derivatives as claimed in claim 1 wherein a N,N-dihydroxyalkylalkylamine is used as an amino alcohol.

10. The method of dyeing articles of cellulose derivatives as claimed in claim 1 wherein a N,N-dialkylhydroxyalkylamine is used as an amino alcohol.

11. The method of dyeing articles of cellulose derivatives as claimed in claim 1 wherein the reaction product of two mols of phenylisocyanate and one mol of N-propyl diethanol amine is used as a carbamic acid ester.

12. The method of dyeing articles of cellulose derivatives as claimed in claim 1 wherein the reaction product of an organic isocyanate and N-hydroxyethyl pyrrolidone is used as a carbamic acid ester.

13. The method in accordance with claim 1 wherein the carbamic acid ester is embodied in the cellulose derivative during the dyeing operation.

14. Organic cellulose derivatives, said derivatives being esters and ethers of cellulose embodying carbamic acid esters of an amino alcohol, the amino group of which is a tertiary amino group.

15. Dyed products in accordance with claim 1.

References Cited in the file of this patent

UNITED STATES PATENTS

| 2,231,891 | Esselmann | Feb. 18, 1941 |
| 2,317,965 | Bestian | Apr. 27, 1943 |

FOREIGN PATENTS

| 492,575 | Canada | May 5, 1953 |
| 450,516 | Great Britain | July 17, 1936 |
| 532,113 | Great Britain | Jan. 17, 1941 |
| 536,686 | Great Britain | May 23, 1941 |
| 613,817 | Great Britain | Dec. 3, 1948 |